United States Patent [19]

Ofterdinger

[11] Patent Number: 4,751,125

[45] Date of Patent: Jun. 14, 1988

[54] COMPOSITE PANEL HAVING A DRIP GROOVE

[75] Inventor: Helmuth Ofterdinger, Moehnesse-Wamel, Fed. Rep. of Germany

[73] Assignee: Duropal-Werk Eberh. Wrede GmbH & Co. KG, Arnsberg, Fed. Rep. of Germany

[21] Appl. No.: 889,632

[22] Filed: Jul. 28, 1986

[30] Foreign Application Priority Data

Jul. 27, 1985 [DE] Fed. Rep. of Germany ....... 3527006

[51] Int. Cl.$^4$ .............................................. B32B 3/04
[52] U.S. Cl. ........................................ 428/68; 52/209;
428/122; 428/126; 428/127; 428/130; 428/161;
428/165; 428/173; 428/192; 428/423.1;
428/425.3; 428/528; 428/537.5
[58] Field of Search ................... 428/161, 163, 68, 76,
428/122, 126, 127, 130, 165, 173, 192, 423.1,
425.3, 528, 537.5; 52/209

[56] References Cited

U.S. PATENT DOCUMENTS 3,022,207 2/1962 Lang .................................... 428/163
3,935,356 1/1976 Minow ................................ 428/163

FOREIGN PATENT DOCUMENTS 3308947 9/1984 Fed. Rep. of Germany ....... 428/161
8514453 7/1985 Fed. Rep. of Germany ....... 428/161
8603035 3/1986 Fed. Rep. of Germany .

*Primary Examiner*—John E. Kittle
*Assistant Examiner*—P. R. Schwartz

*Attorney, Agent, or Firm*—Sixbey, Friedman & Leedom

[57] ABSTRACT

In a composite panel with a core plate (1), a cover plate (2) glued to the upper side of core plate (1), an edge strip glued to an edge (4) of the core plate (1) and a protective sheet (3) or the like glued to the underside of the core plate (1) in which a drip groove (7), running essentially parallel to the edge (4), is provided on the underside of core plate (1) at a certain distance from its edge (4), considerable production simplification and, simultaneously, a considerably improved protection from water drops running in on the underside of the composite panel are attained, by drip groove (7) being put directly into core plate (1), by the cover plate (2) being pulled around to the underside of core plate (1) and/or protective sheet (3) or the like glued to the underside being pulled into drip groove (7) as far as possible and by the area of the drip groove (7) that is not covered by the cover plate (2) and/or protective sheet (2) or the like, including the free edges of the cover plate (2) and/or the protective sheet (3) or the like, being covered by a sealing strip (8) in a mositure-tight manner. In this case, drip groove (7) is particularly advantageously designed overall as a trapezoid and is rounded in the transition areas between the underside of core plate (1) and drip groove (7). The inclination of the sides of drain groove (7), the width of drip groove (7) at the level of the underside of core plate (1) of the composite panel and the depth of drip groove (7) are so dimensioned that jumping of water drops is ruled out for all practical purposes. The sealing strip (8) is advantageously made from injected polyurethane or the like.

12 Claims, 1 Drawing Sheet

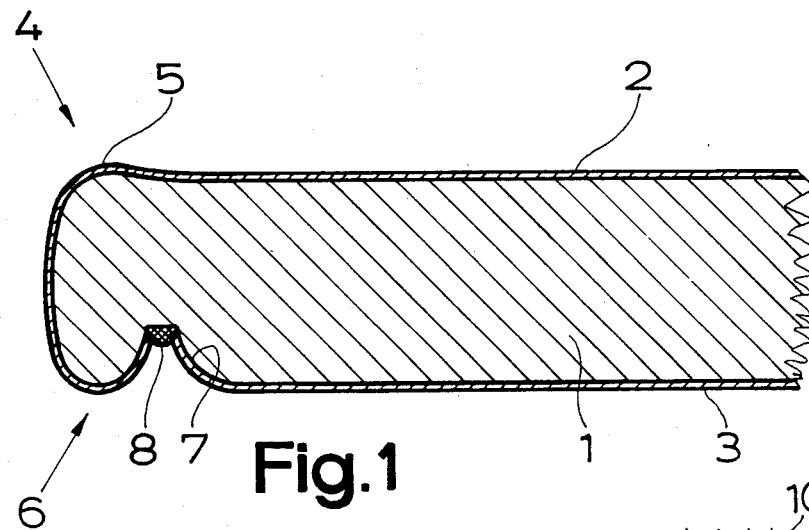
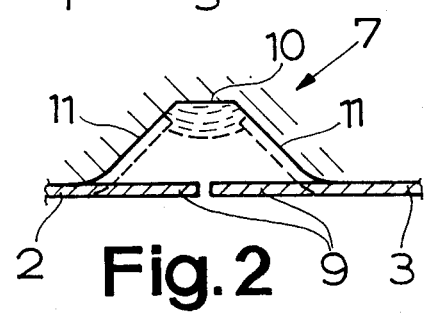
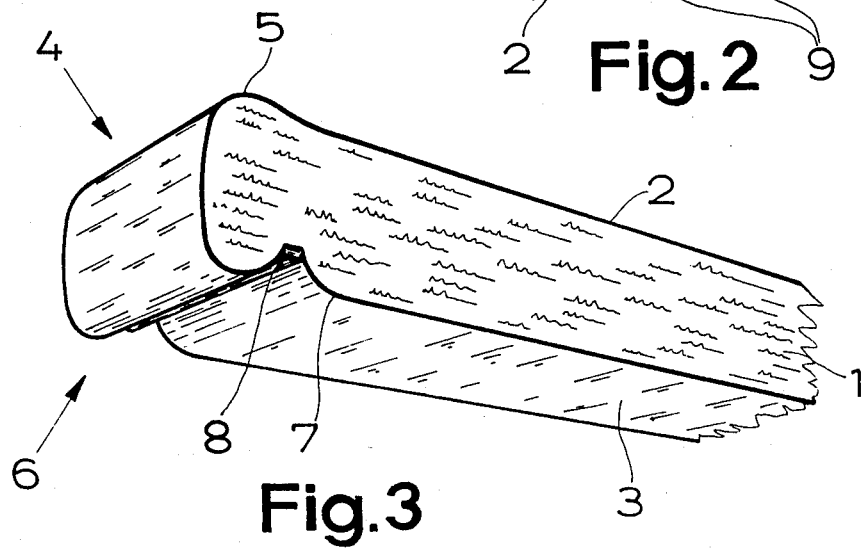

COMPOSITE PANEL HAVING A DRIP GROOVE

The invention relates to a composite panel with a core plate, a cover plate bonded to the upper side of the core plate, an edge strip bonded to an edge of the core plate and a protective sheet or the like bonded to the underside of the core plate, and in which a drip groove, running essentially parallel to the edge, is provided on the underside of the core plate at a certain distance from the edge.

A known composite panel of the initially mentioned type and from which the invention starts is known from German Offenlegungsschrift No. 33 08 947. On the underside of the core plate of this known panel there is provided, at a certain distance from the edge, a drip groove running essentially parallel to the edge. This configuration of the known composite panel takes into account the fact that water running down on the edge of the composite panel does not necessarily drip off the lower edge. Because of the adhesive action of the water, water drops have a tendency to run inward from the lower edge of the composite panel to the underside. This tendency is made more pronounced by the use of water expanded by cleaning agents, since its adhesive action is extraordinarily great. This characteristic is particularly troublesome for composite panels, since the underside of the composite panels is especially vulnerable to penetration of moisture. Moreover, water drops running inward on the underside of the composite panels lead to water accumulation in kitchen furniture and to swelling of unprotected wood parts. By the drip groove running parallel to the edge of the core plate, a dripping off of the water drops should be forced here.

To achieve the effect explained above in the case of the known composite panel the drop groove is made in a profile strip of a thermoplastic water-repellent plastic. The cross section of the drip groove in the profile strip is semi-circular or rectangular so that as sharp a drip edge as possible is formed between the profile strip and the side of the drip groove under the edge aligned with the underside of the core plate. The profile strip itself is a rectangular, groove-shaped and glued in a recess of the core plate and on their under edges, on the edge side, and glued either with the cover plate pulled around the edge of the core plate and/or with the protective sheet or cover plate glued to the underside.

Thus, indeed, by the direct gluing together of the cover plate or the protective sheet or the like/profile strip of thermoplastic material, a glue groove vulnerable to moisture penetration of the cover plate or protective sheet/core plate, especially chipboard, is avoided, but the production cost of this composite panel is comparatively high. That is due, on the one hand, to the profile strip having to be provided separately and, on the other hand, to the required precision in producing the recess in the core plate, since an absolutely precise alignment of the under edge of the profile strip with the underside of the core plate is required. Moreover, the danger that the water drops dripping inward will "jump" the profile strip is surprisingly great. The danger can be met only by a broadening of the drip groove, which again leads to a considerable enlarging of the profile strip and a raising of the production cost.

Starting from the previously explained prior art, the object of the invention is to configure and improve the known composite panel with a drip groove running on its underside so that, from the production aspect, it is considerably simpler and, at the same time, exhibits a better protection from flowing in of the water drops on the underside of the composite panel.

The composite panel according to the invention, in which the above indicated object is achieved, is characterized in that the drip groove is directly put in the core plate, in that the cover plate is pulled around to the underside of the core plate and/or the protective sheet or the like glued to the underside are pulled into the drip groove as far as possible and in that the area of the drip groove not covered by the cover plate and/or the protective sheet or the like, including the free edges of the cover plate and/or the protective sheet or the like, is covered by a sealing strip in a moisture-tight manner.

Firstly, it is essential that, in the case of the composite panel according to the invention, that the drip groove is put directly in the core plate, not in a separate profile strip made of thermoplastic material. The surfaces of the drip groove, thus, at first are not protected from the penetration of moisture. This protection is produced according to the invention by the cover plate being pulled around on the underside of the core plate and/or by the protective sheet or the like itself being glued to the underside, namely since it is pulled into the drip groove as far as at all possible. How far it can be pulled into the drip groove depends on the geometric shape and dimensions of the drip groove, the thickness of the cover plate or protective sheet or the like and also on production considerations.

It is essential that the cover plate and/or protective sheet or the like cover the surfaces of the drip groove to the maximum extent possible, in other words, are glued to the surfaces. The remaining area of the drip groove, covered neither by the cover plate nor the protective sheet or the like, which normally is on the deepest site of the drip groove, is covered in a moisture-tight manner by a sealing strip; namely, so that the free edges of the cover plate and/or protection sheet or the like are encompassed by this sealing strip. Thus, the sealing strip is recessed into the drip groove and thus when the composite panel is installed as a countertop, or other support surface for kitchen furniture or the like, the sealing strip is normally practically invisible. This further offers the possibility of designing this sealing strip purely according to application aspects unhindered by design considerations, especially for providing an optimal moisture sealing.

With the composite panel according to the invention, the total costs connected with the known use of a profile strip are eliminated. Moreover, by elimination of the profile strip, a considerable freedom of design in making the drip groove is obtained, especially in the choice of the width of the drip groove at the level of the underside of the core plate or composite panel. As a result, it is possible to select the width of the drip groove so that a jumping of the drip groove by the water drops is ruled out.

These and further objects, features and advantages of the present invention will become more obvious from the following description when taken in connection with the accompanying drawings which show, for purposes of illustration only, several embodiments in accordance with the present invention.

BRIEF DESCRIPTION OF THE PREFERRED EMBODIMENTS

FIG. 1 shows an embodiment of a composite panel in vertical section;

FIG. 2 illustrates, in vertical section, the area of the drip groove in a composite panel, but in the case of a second embodiment of a composite panel and, FIG. 3 shows i perspective, obliquely from the bottom, a piece of a composite panel according to FIG. 1.

DETAILED DESCRIPTION OF THE PREFERRED EMBODIMENTS

The composite panel represented in FIG. 1 exhibits first a core plate 1 which, in the example illustrated, is a chipboard. A cover plate 2 is glued or otherwise bonded to the upper side of core plate 1, in the represented preferred embodiment a high-pressure laminate (HPL-Platte, DIN 16926), an edge strip (not provided with a separate reference number and which may be formed by part of the cover plate 2) glued to or otherwise bonded edge 4 of core plate 1, and a protective sheet 3 or the like (here in the illustrated embodiment also a high-pressure laminate) glued or otherwise bonded to the underside of core plate 1. Some things have been explained in the Background and Summary portion of this application in regard to these basic parts which, for the sake of brevity, will not be repeated since reference may be made to these explanations.

The illustrated embodiment of a composite panel relates to a particularly preferred embodiment of a composite panel, since core plate 1, here, is rounded on edge 4 and has an edge bead 5 that projects above the upper side and cover plate 2 for forming the edge strip which is pulled from the upper side around the edge of core plate 1 to the underside of core plate 1. The panel is also rounded in the area of lower edge 6 on the underside of the core plate.

FIG. 1 clearly shows a drip groove 7, running essentially parallel to edge 4, on the underside of core plate 1 at a certain distance from edge 4. The distance of drip groove 7 from edge 4 of core plate 1 is generally between 10 mm and 50 mm. Cover plate 2 and, in the embodiment represented here, also protective sheet 3, actually have a thickness of between 0.5 mm and 1.2 mm, preferably or about 0.8 mm, so that the representation in FIG. 1 of an assumed total thickness of core plate 1 of about 36 mm is exaggerated.

FIG. 1 makes particularly clear that drip groove 7 is formed directly into core plate 1, that cover plate 2, pulled around to the underside of core plate 1, on the one hand, and protective sheet 3 glued to the underside in the form of another cover plate, on the other hand, are pulled into drip groove 7 as far as possible, and that the area of drip groove 7 not covered by core plate 2 and protective sheet 3 including the free edges of core plate 2 and of the protective sheet 3 is covered by a sealing strip 8 in a moisture-tight manner. As FIG. 1 in combination with FIG. 3 clearly shows, sealing strip 8 is recessed into drip groove 7, so that normally it cannot be seen in the installed composite panel. Consequently, sealing strip 8 can be selected and designed purely from the application aspects unhindered by design considerations, especially in regard to an optimal protection from moisture.

FIG. 2 shows another embodiment of a composite panel in cross section in the area of drip groove 7, so that some special aspects of the invention can clearly be explained with this figure.

According to a preferred teaching of the invention, drip groove 7, as shown in FIG. 2, is designed overall to be approximately trapezoidal in cross section. At least such a design should apply to edge 4 of core plate 1.

Also a design of drip groove 7 approximately triangular in cross section appears advantageous. In any case, it is essential that the sides of drip groove 7 not run parallel to one another. This results in drip groove 7 at its deepest point being narrower than at the level of the underside of core plate 1 or of the composite panel. This is beneficial to the dripping action as will be explained in greater detail below.

FIG. 2 clearly shows that, in the preferred embodiment represented there, cover plate 2 or protective sheet 3 is glued to the nonparallel sides 11 of drip groove 7 and extend essentially to bottom 10 of drip groove 7. FIG. 2 shows this final condition in broken lines. FIG. 2 also shows an intermediate production step, in solid lines, namely an intermediate step in which projecting free ends 9 of cover plate 2 and protective sheet 3 are not yet glued to sides 11 of drip groove 7. These projecting ends 9 are then bent into drip groove 7 by appropriate forming tools known in the art, and glued to sides 11 of drip groove 7. Finally, a sealing strip 8 (which is also shown in broken lines) is placed n bottom 10 of drip groove 7. Whether projecting ends 9 of cover plate 2 and protective sheet 3 are glued to corresponding sides 11 of drip groove 7 simultaneously or one after the other, depends in each case on the production course of the composite panel.

According to a preferred teaching of the invention, the inside base angle of drip groove 7, between bottom 10 and at least the side 11 that is closer to edge 4 of core plate 1, is between 150 degrees and 120 degrees, preferably about 135 degrees. In FIG. 1, which shows an embodiment of a composite panel, whose drip groove 7 has a cross section of a curved trapezoid, the inside base angle is about 120 degrees. On the other hand, the inside base angle is the case of the drip groove 7 represented in FIG. 2 with a cross section of a straight trapezoid is about 135 degrees, which corresponds to an outside angle of about 45 degrees. This is a very good compromise between a production desire for a drip groove 7 that is as flat as possible and an application desire for a drip groove 7 as deep as possible.

The embodiments represented in the figures show particularly preferred embodiments of the composite panels according to the invention, since the transition areas between the underside of core plate 1 and drip groove 7 are rounded. The radii of curvature are advantageously made to correspond to the minimal radii of curvature achievable with the material of cover plate 2 or protective sheet 3 or the like. While, in FIG. 1, approximately the minimal radii of curvature are achieved, the transition areas in FIG. 2 are rounded with greater radii of curvature.

Rounding of the transition areas between the underside of core plate 1 and drip groove 7 being approximately equal to the radius of curvature in the transition areas between the underside of core plate 1 and edge 4. This is particularly advantageous from the production and design viewpoint. Moreover, the solution of FIG. 1 corresponds to this design, with the cross section of a curved trapezoid or optionally also a curved triangle with the sides of drip groove 7 rounded as a whole to bottom 10.

With reference to the dimensions of drip groove 7 and/or sealing strip 8, there is, of course, a considerable variation in width, which essentially also depends on the thickness of core plate 1, cover plate 2, protective sheet 3 or the like and the distance of drip groove 7 from edge 4. In the case of the dimensions initially indicated or similar ones, it has been found to be particularly advantageous that the depth of drip groove 7 is between 6 mm and 16 mm, preferably between 8 mm and 14 mm, especially about 10 mm to 12 mm, and/or that the width of drip groove 7 at the bottom 10 is between 2 mm and 10 mm, preferably between 4 mm and 8 mm, especially 5 mm to 6 mm, and that the maximum thickness of sealing strip 8 is between 1 mm and 5 mm, preferably about 2 mm to 3 mm. The width of drip groove 7 at bottom 10 has a certain correlation, on the one hand, with the depth of drip groove 7 and, on the other hand, with the depth of drip groove 7 and, on the other hand, with the inside base angle between bottom 10 and sides 11. As FIG. 2 clearly shows, for production reasons, projecting free ends 9 of cover plate 2 and protective sheet 3 are not supposed to abut one another before gluing to sides 11 of drip groove 7. Moreover, the dimensions of drip groove 7, stressed above as particularly preferred, have proven by tests to be especially advantageous for keeping the water drops from jumping.

In regard to the design of sealing strip 8, it was already explained above that, because of the geometric design of the composite panel according to the invention, the strip can be selected and designed practically only according to the application aspects. It is especially recommended that sealing strip 8 be made of an injectable plastic, especially polyurethane, or the like and preferably is made as an extruded sealing bead. Injecting a sealing bead 8, such as a polyurethane sealing bead with very great accuracy can hardly be guaranteed because of the material properties of polyurethane. However, because of the "sunk" arrangement of sealing strip 8 this is not a problem.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Composite panel with a core plate formed of chipboard, or like material, a cover plate formed of a high-pressure laminate material (HPL) and bonded to an upper side of the core plate, an edge strip bonded to an edge of the core plate and a protective sheet or the like bonded to the underside of the core plate, wherein an edge of the core plate is rounded and said edge strip is formed of a portion of said cover plate that has been rolled around the edge of the core plate from its upper side to its underside, wherein a drip groove, running essentially parallel to the edge, is formed directly into the core plate on the underside of the core plate at a certain distance from the edge, wherein the drip groove is of a cross-sectional shape having non-parallel sidewalls and a flat bottom extending between the non-parallel sidewalls, wherein each non-parallel sidewall forms an inside base angle relative to the bottom of the drip groove that is between 150 degrees and 120 degrees, wherein transition areas between the underside of the core plate and both non-parallel sidewalls of the drip groove are rounded, wherein the cover plate and protective sheet are drawn down into the drip groove along a respective non-parallel sidewall, with a respective end edge thereof disposed at the lower end of the respective sidewall adjacent the bottom of the drip groove and are bonded to the respective non-parallel sidewall, and wherein the bottom of the drip groove, which is left exposed by said cover plate and said protective sheet, as well as end edges of the cover plate and the protective sheet, are covered in a moisture-proof manner by an extruded sealing bead of polyurethane or the like injected in situ into the drip groove.

2. Composite panel according to claim 1, wherein said inside base angle is 135 degrees.

3. Composite panel according to claim 1, wherein the radius of curvature in the transition areas between the underside of the core plate and the drip groove is approximately equal to the radius of curvature of the transition area between the underside of the core plate and the edge.

4. Composite panel according to claim 3, wherein the sides of the drip groove are totally rounded to the bottom.

5. Composite panel according to claim 1, wherein the sides of the drip groove are totally rounded to the bottom.

6. Composite panel according to claim 1, wherein the depth of the drip grove is between 6 mm and 16 mm.

7. Composite panel according to claim 6, wherein the width of the drip groove at the bottom s between 2 mm and 10 mm.

8. Composite panel according to claim 7, wherein the maximum thickness of the sealing strip is between 1 mm and 5 mm.

9. Composite panel according to claim 1, wherein the depth of the drip groove is between 8 mm and 14 mm.

10. Composite panel according to claim 9, wherein the width of the drip groove is between 4 mm and 8 mm.

11. Composite panel according to claim 1, wherein the depth of the drip groove is about 10 mm to 12 mm.

12. Composite panel according to claim 11, wherein the width of the drip groove is 5 mm to 6 mm.

* * * * *